United States Patent Office 3,477,515
Patented Nov. 11, 1969

3,477,515
SPRING-LOADED HOE
Melvin Kiemele, 2108 7th Ave. S., Lethbridge, Alberta, Canada, and Henry J. Bergen, P.O. Box 560, Coaldale, Alberta, Canada
Filed Dec. 2, 1966, Ser. No. 598,705
Claims priority, application Canada, Oct. 21, 1966, 973,775
Int. Cl. A01b 35/06, 33/04
U.S. Cl. 172—96          10 Claims

ABSTRACT OF THE DISCLOSURE

A rotary hoe with a rotating carrier having pivoted radially extending hoe members which are spring-biased in their forward direction of movement, and are restrained immediately prior to reaching the lower part of their path of movement and then released for subsequent rapid movement through the lower part of their path of movement.

---

The present invention relates to a rotary hoe. In particular the present invention relates to a rotary hoe arranged to be driven from the drive of a conventional tractor having particular use in the removal of undesired plants from crop rows in which the hoe members are adapted to pass quickly through said crop row at predetermined intervals during passage of said tractor along said crop row thereby reducing the damage to the desired plants in said row.

In conventional rotary hoes, the hoe members are mounted for vertical rotation on a disc and arranged to pass through the crop row at said intervals determined by the speed of the tractor. However, in addition to the transverse motion applied to each hoe member as it passes through the row by the rotation of said disc, there is a longitudinal motion applied to said hoe member by the forward movement of the tractor and there is thus a substantial risk, particularly when the tractor is moving at relatively high speeds, that the desired plants in the crop row will be damaged during the removal of the undesired plants by the hoe members.

It will, therefore, be seen that the faster each hoe member moves through the row to remove the undesired plants, the less is the risk of damage to the desired plants on either side thereof.

The present invention thus provides in such a rotary hoe, for the movement of each hoe member through the row at predetermined intervals at a speed which is substantially higher than that provided directly by the rotation of the disc.

According to the present invention, therefore, there is provided in such a rotary hoe, means for retaining each hoe member against a spring bias immediately prior to its passage through the row for a predetermined further rotation of said disc whereby on release of said hoe member, it passes rapidly through the row under the combined rotation of said disc and the pull of said spring.

Accordingly, the present invention provides a rotary hoe including a carrier mounted for vertical, axial rotation, the carrier preferably being a plate and most desirably a disc, a plurality of hoe members each mounted on said carrier and extending radially to the axis of rotation of said carrier member and beyond the periphery of said carrier, the improvement in which each of said hoe members is pivotally mounted on said carrier and spring biased to a tilling position, retaining means being disposed in the path of said hoe members on rotation of said carrier immediately prior to its lowest position which retaining means is arranged to release said member retained thereby. After a a predetermined further rotation of said carrier, said retaining means releases said member whereby said hoe member passes rapidly through its lowest position in said path at predetermined intervals.

Suitably said hoe retaining means comprises a horizontally extending roller fixed in the rotational path of said hoe members and arranged to roll on a track extending longitudinally of each of said hoe members during rotation thereof, the length of said track being such that said roller leaves said track after said predetermined further rotation thereby releasing said hoe member. Said track preferably comprises a flange extending at right angles to the hoe member and desirably to the leading edge of said hoe member.

The tilling position of said disc is suitably defined by a stop member to which the hoe member is biased by a helical spring extending from said disc to said hoe member. The stop is further suitably padded to avoid damage to the spring on recoil.

In a preferred embodiment of the invention, the disc carries the hoe members on both surfaces thereof suitably in staggered relationship which as will be readily obvious, allows for the removal of undesired plants such as is usually effected by the thinning and weeding of row crops at more frequent intervals.

The present invention also includes within its scope said rotary hoe in combination with a conventional tractor, the drive in said disc being provided by said tractor suitably through a reduction gear or gears.

The pesent invention will be further illustrated by reference to the accompanying drawings which shows one embodiment of the present invention and is not intended to limit the scope of the invention in any way.

Figure 1:
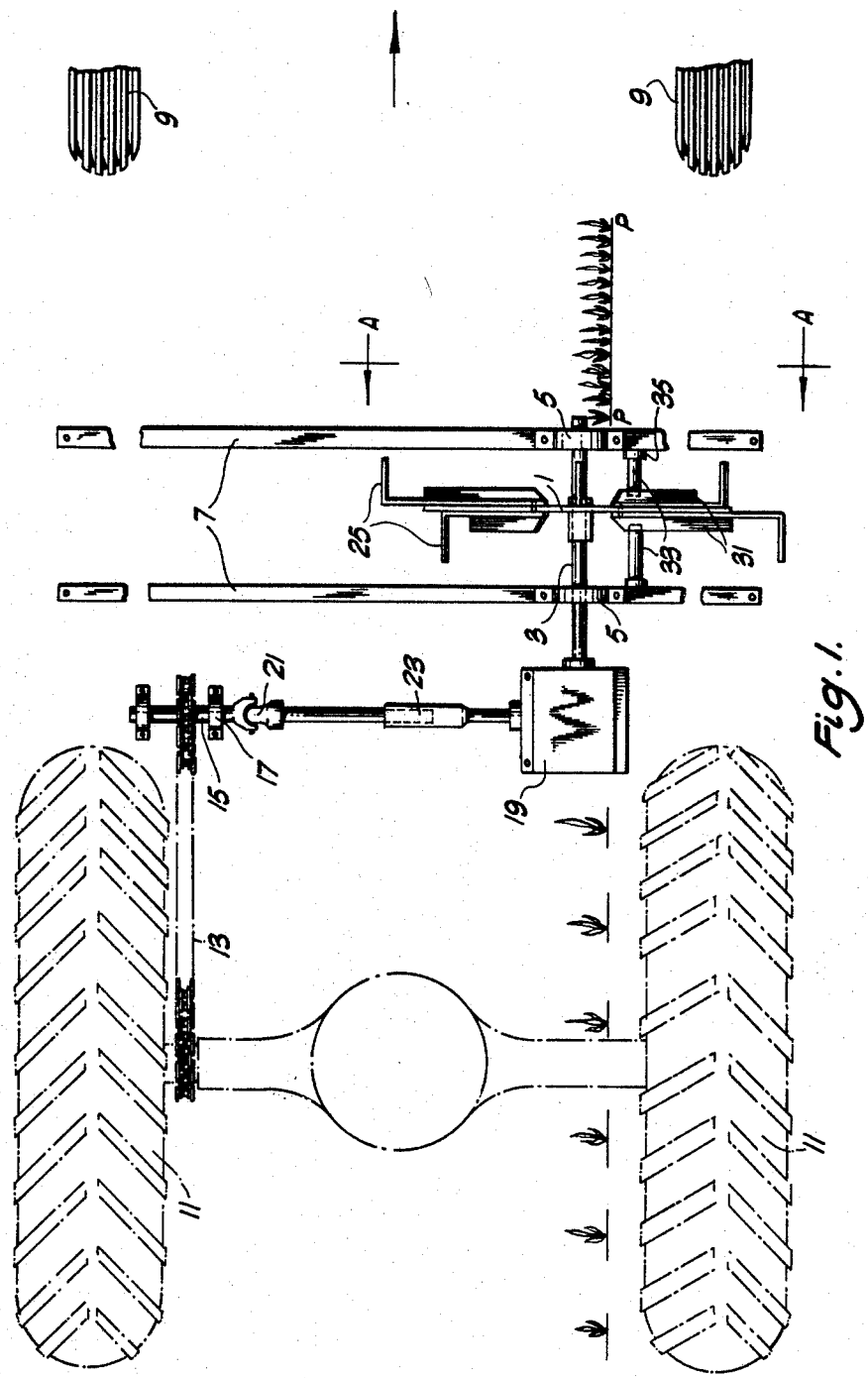
FIGURE 1 is a plan view of a conventional tractor under which is mounted a rotary hoe according to one embodiment of the present invention.

Referring to the drawings, a disc 1 is fixed on a horizontal axle 3 mounted for rotation on bearings 5 on tool bars 7 extending transversely beneath a tractor intermediate the front wheels 9 and the rear wheels 11. Said axle 3 is rotated from the rotation of the rear wheels 11 through a chain drive 13, shaft 15 mounted on bearings 17 and reduction gears 19. The shaft 15 includes a universal joint 21 and has a telescopic portion 23 to allow for transverse adjustment of the disc 1 with respect to the tractor.

Figure 2:
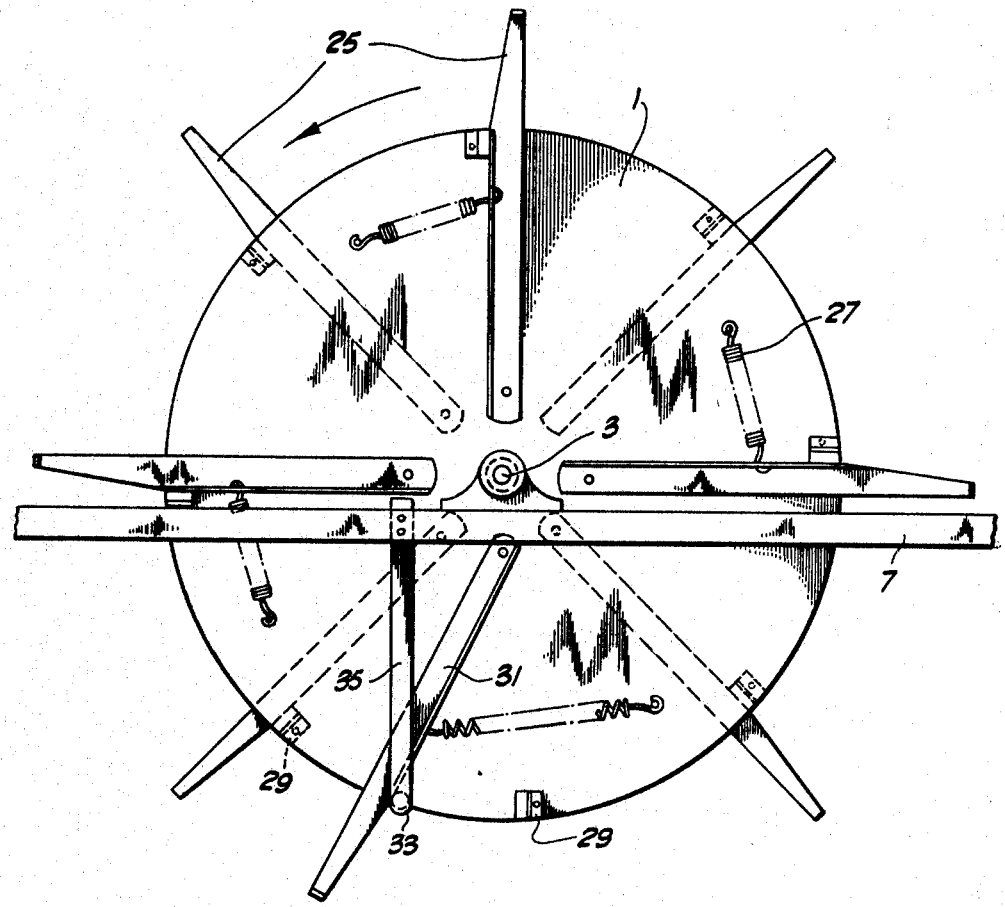
FIGURE 2 is a detail of the rotary hoe taken along the line A—A of FIGURE 1.

Referring particularly to FIGURE 2, the disc 1 carries a plurality of hoe members 25 on both surfaces thereof, the hoe members 25 on one surface being staggered with respect to those on the other. Each hoe member 25 is pivotally mounted on said disc and extends radially from the axle 3 beyond the periphery of the disc 1 and is spring biased by a helical spring 27 against a stop 29 so as to be normally in a tilling position. Further, each hoe member 25 is formed suitably from angle iron such that one leg 31 thereof extends vertically from said disc 1 to provide a flange forming a track for a roller 33. Located immediately prior to the lowest position of the hoe members 25 on said disc 1 during rotation of the disc 1 is a pair of rollers 33 supported by trip bars 35 depending from the tool bars 7 and arranged to contact the leg 31 thereby retaining each said hoe member 25 against the spring bias of the helical spring 27.

In operation, forward movement of the tractor along the crop row P—P as shown on FIGURE 1 causes rotation of the disc 1 transverse to the crop row P—P such that the hoe members 25 pass through the crop row P—P thereby removing undesired plants therefrom. As the disc 1 rotates, each hoe member 25 as it approaches its lowest position in which it passes through the crop row P—P is retained by a roller 33 against the bias of the helical spring 27 and on further rotation of the disc 1, the hoe member 25 pivots on the disc 1 and the roller 33 rolls down the leg 31 until it reaches the end of the leg 31 when the hoe member 25 is released and passes rapidly under the action of the horizontal spring 27 through the crop row P—P thereby reducing the forward movement of the hoe member 25 as it passes through the crop row P—P.

The distance between plants can be accurately set by adjusting the speed of rotation of the hoe members suitably by changing the reduction of the reduction gear or by any other suitable means. Additional adjustment may be obtained by using hoe members of different lengths.

What we claim as our invention is:

1. In a rotary hoe including a carrier mounted on a frame for rotation about a horizontal axis parallel to the direction of its travel, a pluralty of hoe members each mounted on said carrier and extending radially to the axis of rotation of said carrier member and beyond the periphery of said carrier, the improvement in which each of said hoe members is pivotally mounted on said carrier and spring biased to a radial position, retaining means fixed on said frame being disposed in the rotational path of successive said hoe members on rotation of said carrier immediately prior to their respective lowest positions which retaining means is arranged to engage and release said successive members retained thereby after a predetermined further rotation of said carrier whereby said hoe members pass rapidly through their respective lowest positions in said path at predetermined intervals.

2. A hoe as claimed in claim 1, in which said retaining means comprises a horizontally extending roller fixed in the rotational path of said hoe members and arranged to roll on a track extending longitudinally of each of said hoe members during rotation thereof, the length of said track being such that said roller leaves said track after said predetermined further rotation thereby releasing said hoe member.

3. A hoe as claimed in claim 1, in which said retaining means comprises a horizontally extending roller fixed in the rotational path of said hoe members and arranged to roll on a track in which said track comprises a flange extending at right angles to and longitudinally of each of said hoe members during rotation thereof, the length of said track being such that said roller leaves said track after said predetermined further rotation thereby releasing said hoe member.

4. A hoe as claimed in claim 1, in which said retaining means comprises a horizontally extending roller fixed in the rotational path of said hoe members and arranged to roll on a track in which said track comprises a flange extending at right angles to and longitudinally of each of said hoe members during rotation thereof, the length of said track being such that said roller leaves said track after said predetermined further rotation thereby releasing said hoe member in which the flange is on the leading edge of said hoe member.

5. A hoe as claimed in claim 1, in which each hoe member is spring biased to said radial position defined by a stop, by a helical spring extending between said hoe member and said carrier.

6. A hoe as claimed in claim 1, in which said carrier is a plate.

7. A hoe as claimed in claim 1, in which said carrier is a disc.

8. A hoe as claimed in claim 1, in which said carrier is a disc having said hoe members mounted on each face thereof.

9. A hoe as claimed in claim 1, in which said carrier is a disc having said hoe members mounted on each face thereof in staggered relationship to one another.

10. In a combination with a tractor, a hoe as claimed in claim 1, said carrier being arranged to be driven from a drive in said tractor through a reduction gear.

References Cited

UNITED STATES PATENTS

| | | | |
|---|---|---|---|
| 1,388,953 | 8/1921 | Knight | 172—96 |
| 1,657,064 | 1/1928 | Bullock | 172—544 |
| 2,595,812 | 5/1952 | Quillen | 172—543 |

ROBERT E. PULFREY, Primary Examiner

WALTER J. CONLON, Assistant Examiner

U.S. Cl. X.R.

172—108, 544